July 11, 1939.  W. BIRD ET AL  2,165,954
DEVICE FOR TIME-CONTROLLING THE OPENING OF PARACHUTES
Filed March 31, 1937  2 Sheets-Sheet 1
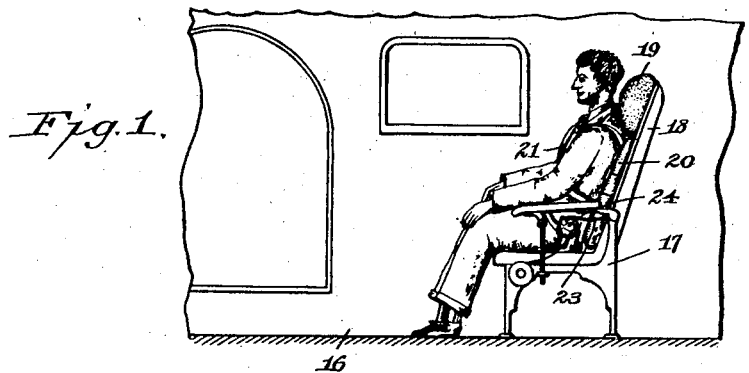
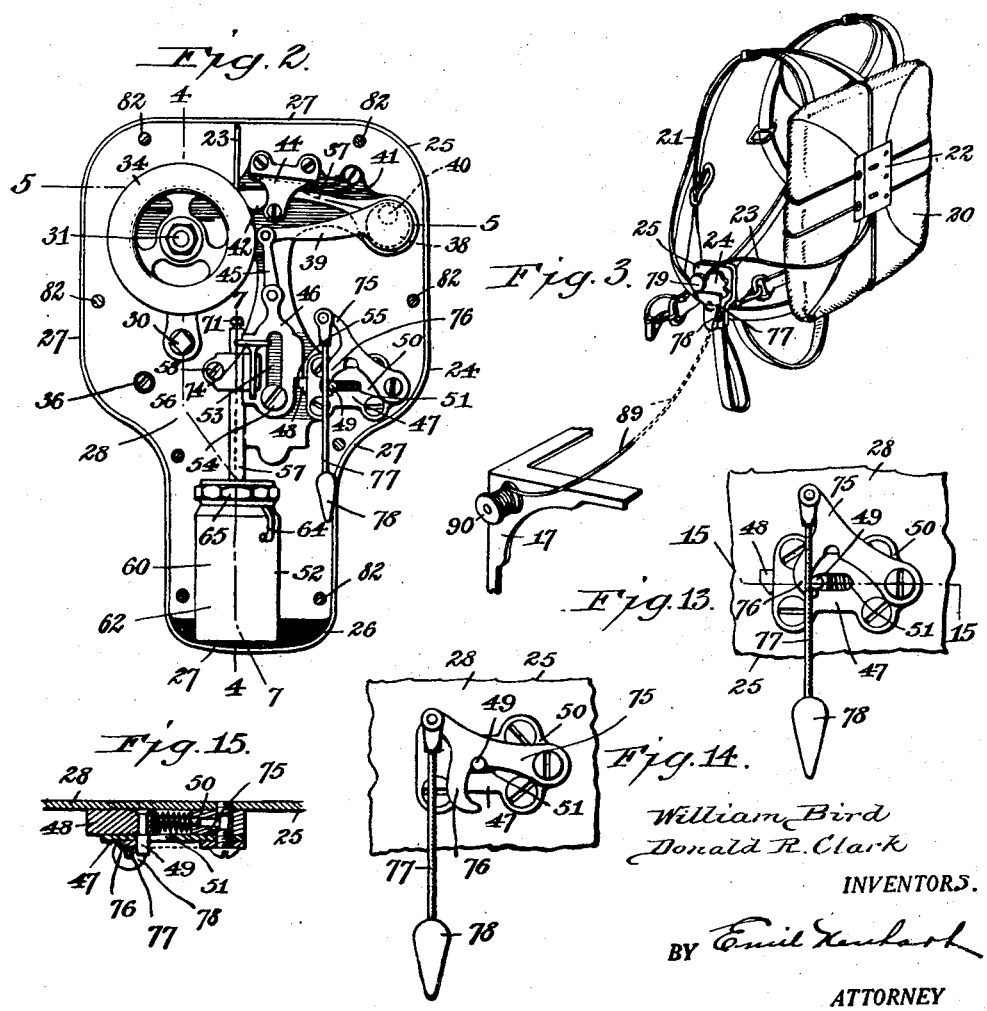
William Bird
Donald R. Clark
INVENTORS.
BY Emil Xenlark
ATTORNEY

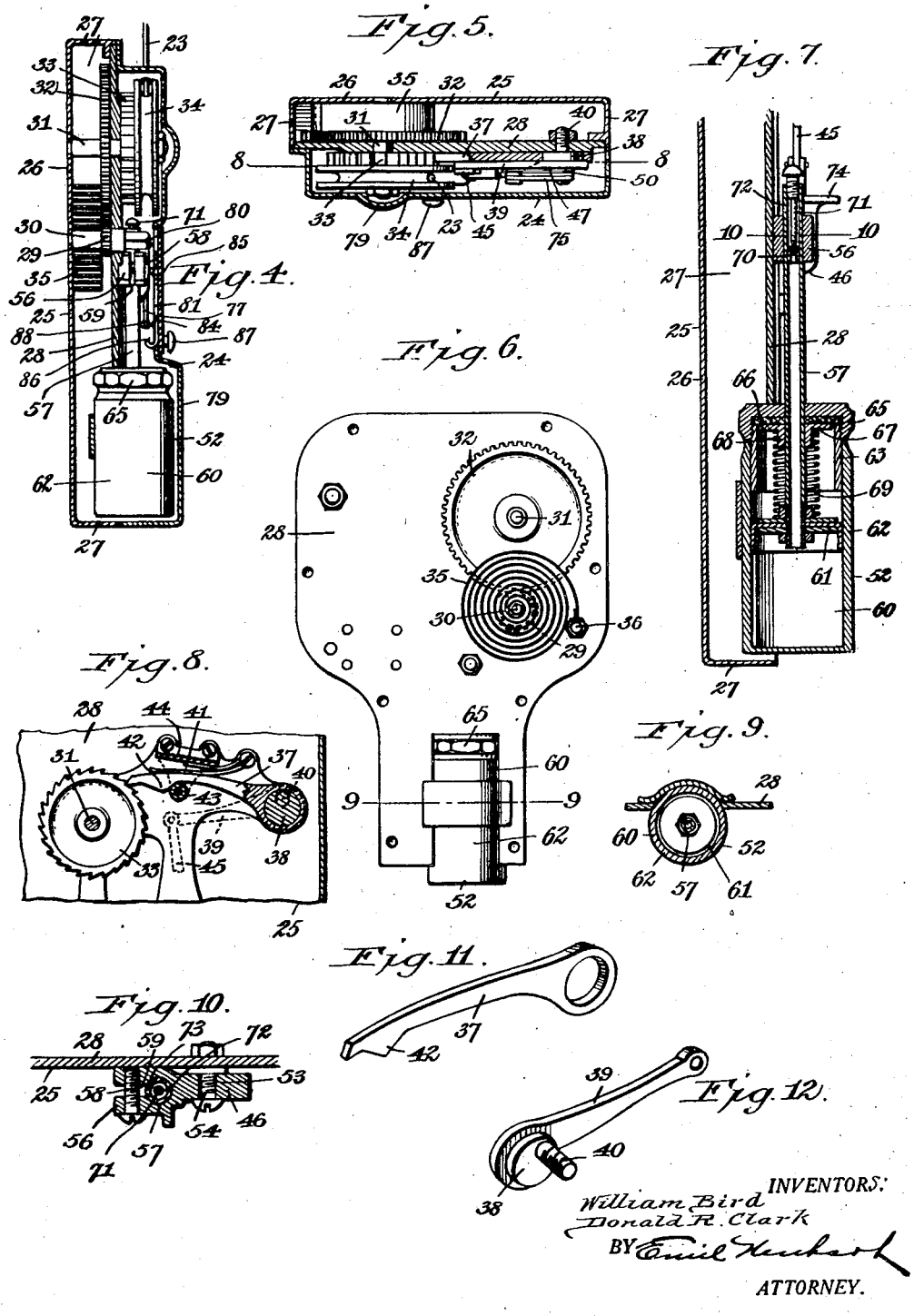

Patented July 11, 1939

2,165,954

UNITED STATES PATENT OFFICE 2,165,954

DEVICE FOR TIME-CONTROLLING THE OPENING OF PARACHUTES

William Bird, Buffalo, and Donald R. Clark, Amherst, N. Y.

Application March 31, 1937, Serial No. 134,030

12 Claims. (Cl. 244—150)

Our invention relates to time-control release-mechanism designed to operate parachutes attached to occupants of airplanes, or employed for delivery of mail packages, etc., or used for discharging freight, and ammunition and supplies or other equipment used in warfare.

The primary object of our invention is to provide improved mechanism for releasing parachutes from airplanes, which may be controlled manually or automatically, and whereby the difficulties now encountered in release-mechanisms or devices designed up to the present day for this purpose are fully obviated.

Another object of our invention is to provide improved means for safely delivering passengers, or large or small objects, from an airplane, with assurance that the passengers, or the objects, will be safely delivered within a comparatively small predetermined area.

Another object of our invention is to provide improved time-controlled release-mechanism, whereby the time at which the parachute is permitted to open will be accurately determined, such time being governed by controlling-mechanism adjustable to vary the time according to the conditions under which a flight is being made, or the conditions under which the user leaves the plane; assurance being thereby had that a person leaving an airplane, willingly or unwillingly, or being unconsciously thrust from the plane, will be safely delivered to the ground without any possibility of the parachute, while opening or after being opened, becoming entangled with any portion of the airplane.

Another object of our invention is to provide release-mechanism which is absolutely reliable, durable, and inexpensive in construction and comparatively simple in character.

A still further object of our invention is to provide an improved device of this character in which the time-controlling element or device can be set to meet individual desires or requirements.

With the above and other objects to appear hereinafter, our invention consists in the novel timed releasing-mechanism wherein provision is made for the lapse of a predetermined period of time before the parachute pack can be opened to release the parachute, and wherein the extent or range of drop made by a person or an object delivered from a plane is governed by improved time-controlled means which may be varied in action to cause opening of the parachute at varied distances from the airplane in the descent of a person jumping or being pushed or thrown therefrom.

The invention also consists in the novel features of construction and in the arrangement and combination of parts to be hereinafter described and more particularly pointed out in the subjoined claims.

In the drawings,

Fig. 1 shows the application of our invention to a passenger shown seated in an airplane.

Fig. 2 is a front elevation of our improved time-control release-device, the cover being removed therefrom.

Fig. 3 is a perspective view of a parachute pack, a harness for the same, and means to operate the release-device, either manually or automatically.

Fig. 4 is a vertical section taken on line 4—4, Fig. 2.

Fig. 5 is a cross section taken on line 5—5, Fig. 2.

Fig. 6 is a rear view of the front wall or plate of the casing proper.

Fig. 7 is an enlarged vertical section taken on line 7—7, Fig. 2.

Fig. 8 is a vertical transverse section taken on line 8—8, Fig. 5.

Fig. 9 is a transverse section taken on line 9—9, Fig. 6.

Fig. 10 is an enlarged section taken on line 10—10, Fig. 7.

Fig. 11 is a detached perspective view of the ratchet detent-lever.

Fig. 12 is a detached perspective view of the actuator lever, the lever being shown reversed from the position in which it is used, to illustrate the eccentric integral therewith.

Fig. 13 is a front view of the locking device and the trip lever associated therewith, the parts being shown in normal position in which the locking device serves to maintain the setting element or device in trapped position.

Fig. 14 is a similar view showing the lock bolt of the locking device in retracted position, caused by the actuation of the trip lever, the latter being shown in lowered or locking position.

Fig. 15 is a horizontal section taken on line 15—15, Fig. 13.

While we have shown our invention applied directly to the harness to which a parachute pack is attached, the application of the device may be otherwise made; for example, it may be applied directly to an individual or carried by him, and may be used in various ways in connection with inanimate and other objects.

The application of our improved invention as shown in the drawings is to be considered as illustrative only.

In the particular form shown, the reference numeral 16 designates a portion of an airplane in which is shown a seat 17 designed for passenger use. This seat may have a pocketed back 18 equipped with a head rest 19, and in the pocket of said back, beneath the head rest, the parachute pack 20 may be positioned. The parachute pack may be secured to the passenger by means of a harness 21 of the general type shown in Fig. 3, or otherwise.

Since parachute packs for pilots are used as seat cushions, harnesses will naturally vary in arrangement and construction. In all cases, however, the pack includes a parachute (not shown), which opens up upon actuation of common retainer means 22 applied to the pack-covering, and which is actuated by a pull cord or cable, such as 23, which may, broadly considered, be termed a serving medium.

The parts thus far described form no portion of our invention. They are well known and may vary in form, appearance, and construction.

Our improved time-control release-device, considered as a whole, is designated by the numeral 24. This device may be attached to the harness 21 and includes a casing 25 having a rear wall 26, edge walls 27, and a removable front wall or plate 28. Within the casing is a pinion 29 secured to a stub shaft 30 rotatable in the removable front wall or plate 28 and stepped into the rear wall 26, said stub shaft extending outwardly beyond the front face of said front wall or plate and being squared or otherwise fashioned for application thereto of a suitable key, by means of which the shaft may be rotated.

Journaled in said front wall or plate 28 and stepped into the rear wall 25 is a shaft 31 to which is secured a gear wheel 32 which is in mesh with the pinion 29. Like the stub shaft 30, the shaft 31 extends forwardly through the front wall or plate 28 and has a ratchet wheel 33 secured thereto and a cord or cable reel 34, to which the outer end of the pull cord or cable 23 is secured. It is intended that this cord or cable be fully unwound from the reel, or at least be slack, when the parts of the device are in normal position, or what may be stated as "set condition". Within the casing is a clock-spring 35, one end of which is secured to the stub shaft 30 and its other end to a pin 36 extending rearwardly from the front wall or plate 28.

On the front or outer face of said front wall or plate a ratchet detent-lever 37 is arranged which is mounted for oscillation on an eccentric 38 formed on an actuating-lever 39 rotatably secured to the front wall or plate 28, as at 40. The outer end of the ratchet detent-lever 37 is normally engaged with a tooth of the ratchet-wheel 33 and is so retained by a spring 41 exerting force against the upper edge of said detent-lever. Projecting from the lower edge of said lever is a toe 42 serving as a cam-element which is maintained by said spring 41 against a roller 43 surrounding one of the screws fastening a retainer or guide-bracket 44 to the front wall or plate 28 of the casing. The actuating-lever 39 is pivotally connected to one end of a link 45, which in turn is pivotally connected to a setting element 46 normally held elevated by a lock-device 47 secured to the front wall or plate 28 and having a spring-pressed lock-bolt 48 from which a release stud 49 projects, the lock-bolt 48 being slidable within a casing 50 having a slot 51 therein, through which said release stud projects and along which it slides.

The setting element or device 46 is secured to a dash-pot 52 with a view of timing its movement in a given direction, and it may here be stated that this setting element or device is moved automatically in said given direction and manually in its other, the timing of its automatic movement being controlled by the dash-pot. This setting element or device is provided with a vertically-disposed slot 53 through which a guide and stop element, in the form of a screw 54, is passed; said screw being threaded into the front wall or plate 28 of the casing. Said setting element or device has a downwardly-facing shoulder 55 designed to be engaged by the lock-bolt 48 with a view of holding said element or device in its elevated or trapped position. It is also provided with a clamp in the form of a split laterally-extending lug 56, between the parts of which the piston rod 57 of the dash-pot is clamped by means of a screw 58 passed through the front portion of said split lug and threaded into the rear portion thereof. It is to be noted that this split lug is so formed that a space 59 is provided between the two parts thereof for a purpose to appear hereinafter.

The dash-pot comprises a cylinder 60 detachably secured to the front wall or plate 28 of the casing, and a piston 61 within said cylinder which is axially secured to the piston rod 57. The cylinder is formed of two parts 62, 63, part 62 being in the form of an elongated cup-like portion forming the cylinder proper, and part 63 in the form of a sleeve thrust into the upper open end of said cup-like portion; the sleeve being connected to the latter by pin and angular-slot connection 64 arranged at diametrically opposite points; or in other words,—by a bayonet joint. The sleeve-like portion is externally threaded at its upper end and has a flanged cap 65 threaded thereon, the flange of which bears against the upper end of said cup-like portion or cylinder proper. This cap has the piston rod 57 extending axially therethrough, and within it is a cork 66 or other disk-like backing through which said piston rod passes and a metallic buffer 67 in contact with said backing, provided with a depending boss 68 adapted to enter the upper end of a spiral spring 69 which surrounds the piston rod and bears with its lower end against the piston. When seating this cap portion firmly against the sleeve portion of the cylinder, the cork disk or other backing is compressed to prevent leakage of air along the piston rod. The piston rod is tubular and opens at its lower end into the cylinder beneath the piston. Near its upper end it has arranged therein a collar 70, the opening of which is preferably beveled at its upper end. Said rod is screw-threaded internally at its upper extremity to receive a needle valve 71, and the space between the pointed end thereof and the beveled portion of said collar controls the passage of air from the cylinder. This needle valve completely closes the upper end of the piston rod, but its lower portion is of smaller diameter than the interior of said rod so that an intervening annular space 72 is provided between the wall of said rod and the reduced portion of the needle valve.

In the wall of the piston rod an air-escape opening 73 is formed, and this opening is of a size to allow for the escape of the maximum air from the cylinder of the dash-pot. As clearly shown in Fig. 13, said air-escape opening is positioned in line with the space 59 between the front and rear portions of the split lug extending laterally from the setting device 46 so as to allow the free escape of air from the dash pot. By so positioning the air-escape opening, it is concealed and protected from the ready entrance of dirt or other foreign matter which would tend to clog the same, or at least reduce the same in size and thereby materially interfere with the timing of the device.

The setting device 46 has an outwardly-extending projection 74 to be grasped by the operator for positioning the device in normal or trapped position, in which position it is retained by the lock-bolt 48 of the lock-device. Associated with the lock-device is a trip lever 75 forming portion of release mechanism, and normally it is so positioned that the release stud 49 is in contact with one end of the slot 51 formed in the casing of the lock-device. This trip lever has a cam-arm 76 extending therefrom in contact with said release stud 49, said cam-arm being so formed that upon actuating said trip lever the release stud will be moved toward the opposite end of the slot 51 and cause the lock-bolt 48 to be retracted; thereby releasing the setting element or device 46. Attached to the free end of the release lever is an actuating wire or cord 77 which may have a weight 78 at its lower end to maintain the release cord in depending position.

Fitted over the casing so as to enclose the mechanism on the outer side of the front wall or plate 28 is a cover 79. This cover has an opening 80 therethrough alined with the square outer end of the stub shaft 30, the opening being of a size to permit the passage therethrough of a key adapted to fit over the projecting squared end of said shaft.

Formed in the cover is an opening 81 of a size to enable setting of the device and adjustment of the several parts thereof without completely removing the cover 79 from the casing, particularly since the cover is securely fastened to the casing by a number of screws 82 arranged along the margin thereof. The opening 81, however, is closed by a lid 84 provided with a retainer flange 85 at its upper end adapted to engage the upper wall of said opening and at its lower end with a spring 86 yieldingly engaging the lower wall of said opening. This lid is provided with a finger hold 87 which can be easily taken hold of to exert pressure outwardly on the lid with a view of disengaging the spring from the lower wall of the opening and thus permit the lid to be conveniently removed for the purpose of gaining access to parts of the mechanism enclosed by said cover.

The cover is also provided with an opening 88 through which the release wire or cord 77 is passed, with the weight at the lower end thereof extending outside of the cover so that it can be conveniently grasped and thus serve as a handle for the wire or cord. If desired, the release wire or cord may be lengthened, as shown at 89 in Fig. 3 (partly in full lines and partly in dotted lines), and it may be wound around a spring-controlled reel 90 fastened to the seat 17, or some other fixed point in the airplane; the reel being of the common self-winding form employed in various arts for automatically winding up a flexible element and permitting the uncoiling of said flexible element under strain.

The setting and the operating of the device is as follows:

The piston of the dash-pot is elevated by grasping the outwardly-extending projection 74 of the setting element or device 46 and moving the same upwardly rectilinearly to a point where the downwardly-facing shoulder 55 formed on said setting element or device clears the spring-pressed lock-bolt 48 of the lock-device 47 so as to enable said lock-bolt to engage said shoulder and retain both the setting element or device 46 and the piston of the dash-pot 52 in elevated position. Preparatory to this, however, it will be necessary to swing the trip lever 75 upwardly to enable the release stud 49 to move along the slot 51 and thus give the lock-bolt 48 freedom of movement. The rectilinear upward movement of the setting element or device 46 results in the actuating-lever 39 being swung on its center 40, thereby compelling the eccentric 38, integral with said actuating-lever, to rotate and cause the ratchet detent-lever 37 to move forwardly so that its free end will engage the ratchet wheel 33. During this outward movement the ratchet detent-lever is caused to componently move downwardly through the action thereon of the spring 41 and the toe or cam element 42 to ride in contact with the roller 43, thereby assuring spring-pressed contact of the ratchet detent-lever with said ratchet wheel.

A suitable key may be applied at this time to the projecting end of the stub-shaft 30, and upon rotating said shaft, the clock-spring 35 becomes wound up, and since the pinion 29 is secured to said stub-shaft and is in mesh with the gear wheel 32 which is secured to the shaft 31, the ratchet wheel 33 will be rotated, due to the fact that this ratchet wheel is also secured to the shaft 31. During the rotation of the ratchet wheel the teeth thereof successively ride in contact with the free end of the ratchet detent-lever 37, causing the same to oscillate on the eccentric 38 of the actuating-lever 39. The device is now set for use when required.

We preferably plan to have the device actuated manually, and by adjusting the needle valve 71, the escape of air from within the dash-pot cylinder 60 is definitely regulated, the rectilinear downward movement of the piston within said cylinder being controlled by the speed of the air escaping from the tubular piston rod 57 and the air-escape opening 73 therein; the air delivered through said air-escape opening having freedom of escape through the space 59 formed in the split lug 56 extending laterally from the setting element or device 46.

While the upward movement of the piston within the dash-pot cylinder is effected manually and may be accomplished under any speed, the downward movement of said piston is controlled entirely by the speed at which the air beneath the cylinder of the dash-pot is allowed to escape through the air-escape opening 73 in the piston rod; and it is to be noted that during the manually effected upward movement of said piston the spiral spring 69 will become compressed.

Assuming it is found necessary for passengers to alight from the airplane while in travel, a steward or other attendant of the airplane will open the door of the cabin and request or command the passengers to approach and jump, each passenger of course having an attached parachute pack. The attendant then grasps the release cord 77 of the passenger and causes the passenger to jump from the plane, either under voluntary action or forcibly. Flying under normal altitude, the needle valve 71 is adjusted to effect an opening of the parachute pack within three seconds after pulling the actuating wire or cord 77, which causes the trip lever 75 to swing downwardly and the cam arm 76 of said lever to ride in contact with the release stud of the lock-device, which results in the retraction of the lock-bolt 48 to free the setting element or device 46. The spiral-spring within the dash-pot then exerts its force to move the piston 61 downwardly, the speed of which movement is governed by the freedom with which the air underneath the piston is allowed to escape through the piston rod under the adjustment of the needle valve 71. The downward movement of the setting element or device 46 results in the link 45 swinging the actuating-lever 39 on its center 40, thereby causing rotation of the eccentric 38 on said actuating-lever. Since this eccentric is rotatable within the ratchet-lever, the latter is drawn rearwardly, with the result that the toe or cam element 42 thereon rides upwardly on the roller 43 and causes this ratchet detent-lever to be released from the ratchet wheel 33 at the moment that the piston within the dash-pot reaches the end of its downward movement. The releasing of the said ratchet wheel results in the immediate "snap release" of the clock-spring, which instantly becomes unwound and causes the ratchet wheel 33 and the cord or cable reel 34 to be rotated in a direction opposite that in which it was rotated when winding up the clock-spring by means of the key.

By reason of the fact that the pull cord or cable 23 is secured to the cord or cable reel 34, it will be subjected to pulling action, with the result that the retainer means 22 in the parachute pack or pack covering will be released to cause the pack covering to open and the parachute to spread and lower the person safely to the ground. Since an interval of three seconds after jumping from an airplane is sufficient to reach a region sufficiently below that in which the plane is traveling, all possibility of the parachute, in its opening movement, becoming entangled with the plane is entirely obviated.

It is of course understood that a passenger may actuate the lock-mechanism to release the setting element or device 46 and instantly jump from the airplane, instead of depending on the attendant, and after such actuation and the predetermined length of time has elapsed, the parachute will become unfurled. It will be clear, therefore, that when, through fear or otherwise, a passenger does not leave the plane when requested to do so, the attendant will actuate the release-mechanism and forcibly eject the passenger, with absolute assurance that the parachute will open and deliver the passenger safely to the ground.

As a modified form of our invention, we employ the lengthened release cord or cable 89, shown in Fig. 3, and adjust the self-winding reel so that the cord or cable will be paid out as the passenger leaves his seat, the adjustment being such as to cause automatic release of that portion of the cord or cable extending from the self-winding reel 90 from the portion directly connected with the release-mechanism, and for this purpose the two portions of the cord or cable are connected together with a suitable self-detaching device (not shown) which may be of any form or construction capable of causing separation of the two portions of the cord or cable when the strain on the latter reaches a predetermined degree. For example, this can be controlled so that when the passenger leaves the airplane, the extended portion of the cord or cable 89 will become detached from the portion thereof attached to the release device, but only when the strain on the release device is sufficient to completely actuate the latter and thus assure the opening of the parachute after the lapse of the desired period of time, which of course will be definitely controlled by the adjustment of the needle valve 71.

With every passenger and other occupant equipped with this invention, orderly and regular descent of all occupants of an airplane can be quickly made, one following another, without the possibility of the parachutes coming in contact with any portion of the airplane, or with each other.

Having thus described our invention, what we claim is:

1. An automatic control-device including a rectilinearly movable setting-element movable from one position to another and reversely, a serving medium operatively connected with said setting-element, locking means movable perpendicularly to the movement of said setting-element for retaining the latter at the end of its movement in one direction, straining means to strain said setting-element against its retention at the end of its movement in said last-mentioned direction, time-control mechanism held against action by said locking means and comprising a dash-pot including a piston rod to which said setting-element is secured, and means to actuate said locking means to cause the latter to free said setting-element and permit said straining means to allow movement of said setting-element and to cause operation of said serving medium.

2. An automatic control-device for causing parachutes to open, comprising a dash-pot including a reciprocable piston retained at the end of its movement in one direction, means to permit said piston to be released from its retained position, an element movable in two directions and maintained under strained condition at the end of its movement in one direction, means between said dash-pot and said movable element to cause the latter to be released from its strained condition so as to automatically move in its other direction after said piston reaches a predetermined point of its movement in its other direction, said last-mentioned means including a ratchet wheel and an eccentrically actuated detent-lever engaging said ratchet wheel, means to connect the eccentric mounting for said detent-lever with said piston, and means connected to said movable element adapted for connection with a parachute pack to permit the latter to be opened when said movable element is traveling free of restraint.

3. A control-device for causing parachutes to open, comprising a dash-pot including a reciprocable piston retained at the end of its movement in one direction, a spring to cause said piston to move in its opposite direction, means to release said piston from its retained position, a power element movable in two directions and maintained under strained condition at the end of its movement in one direction, means actuated by said piston to cause said movable element to be released from its strained condition and automatically move in its other direction after said piston reaches a predetermined point in the range of its movement under action of said spring, said means including an eccentric and detent means co-operating with said power element to hold the latter in strained condition, and connection between said power element and a parachute pack whereby the latter may be opened when said power element is freed from its strained condition.

4. A control-device for causing parachutes to open, comprising a dash-pot including a cylinder, a piston reciprocably arranged with said cylinder, a piston rod secured to said piston and extending outwardly through said cylinder, a spring whereby said piston is held at the end of its movement in one direction, a locking-device maintaining said piston at the end of its movement in the other direction, a reel rotatably mounted and having a cord secured thereto adapted to be wound thereon, said cord having connection with a parachute pack, means to manually rotate said reel in one direction, a clock-spring strained while so rotating said reel, means to retain said clock-spring in strained condition and said reel at the end of its movement in said direction including a ratchet wheel and an eccentrically-mounted detent lever engaging said ratchet wheel, and means interposed between said piston rod and the eccentric mounting for said detent lever to retain said reel at the end of its movement in the said direction and to cause release of said reel from its retained condition a predetermined time after actuating said locking device to release said piston, said dash-pot having means to govern the interval of time between the actuation of said locking device and the release of said reel from its retained condition.

5. A time-control device for causing parachutes to open, comprising a casing having a clock-spring therein, a shaft extending therethrough for winding up and straining said clock-spring, retention means to hold said shaft under strain of said clock-spring, said retention means including a ratchet wheel and an eccentrically-mounted detent lever engaging said ratchet wheel, timing mechanism carried by said casing and retained against actuation, a cord adapted for connection with a parachute pack, said cord having take-up connection with said shaft and being held in slack condition when said shaft is maintained under strain of said clock-spring, and means interposed between said time-control device and said detent-lever to be actuated by said time-control device and cause release of said retention means so as to permit the automatic winding up of said cord and cause said parachute pack to be opened.

6. A time-control device for causing a parachute to open, comprising a casing having a clock-spring therein, a shaft extending therethrough for winding up and straining said clock-spring, a ratchet wheel controlled for action by said shaft, a ratchet detent lever secured to said casing and co-acting with said ratchet wheel, an actuating lever having an eccentric projection on which said ratchet detent lever is mounted, a reel having a cord secured thereto to be wound thereon, time-control mechanism carried by said casing, means to permit said time-control mechanism to be set into action, and means interposed between said actuating lever and said time-control mechanism to cause rotation of said projecting eccentric and release of said ratchet detent lever from said ratchet wheel when said time-control mechanism reaches a predetermined point in its actuation.

7. A time-control device for causing parachutes to open, comprising a casing having a clock-spring therein, a shaft extending therethrough for winding up and straining said clock-spring, a pinion on said shaft within said casing, a gear wheel in mesh with said pinion, a shaft to which said gear wheel is secured extending outwardly through the front of said casing, a ratchet wheel secured to said last-mentioned shaft, a cord reel also secured to said last-mentioned shaft and having a cord secured thereto adapted for connection with a parachute pack, a ratchet detent lever pivotally secured to said casing and engaging said ratchet wheel to hold said clock-spring in wound-up condition and to retain said ratchet wheel and said cord reel at the ends of their movements in one direction under strain of said clock-spring, and means to effect predetermined timed operation of said ratchet detent lever including means to effect a change in the position of the axis of the pivot of said ratchet detent lever to cause release of the latter from said ratchet wheel.

8. A time-control device having a cord reel rotatably mounted and spring-strained at the end of its movement in one direction, a ratchet wheel rotatable with said cord reel, a ratchet detent lever adapted to engage said ratchet wheel and retain said cord reel in spring-strained position, and an actuating lever pivotally mounted and having a projecting eccentric whose axis is non-coincident with the pivot of said ratchet detent lever and on which said detent lever is mounted.

9. The combination of timing-mechanism including a rectilinearly movable rod, a setting-element secured to said rod, a lock bolt adjacent said setting element adapted to engage the same, an actuating lever operatively connected with said setting-element and having an eccentric boss thereon, a ratchet detent lever pivotally mounted on said eccentric boss, a ratchet wheel engaged by said ratchet detent lever, and a trip element adapted to actuate said lock bolt and release said lock element to permit actuation of said timing-mechanism and through the medium of its rectilinearly movable rod control the actuation of said ratchet detent lever.

10. A time-control device having a power-actuated cord-straining device, retention means to hold said cord-straining device in strained condition including a ratchet wheel and a detent lever engaging said ratchet wheel, a rotatable eccentric on which said detent lever is mounted, a dash-pot in fixed relation to said cord-straining device including a vertically movable rod, a lock device for locking said rod in setting position, and operative connection between said rod and said eccentric to cause actuation of said ratchet detent lever and release said cord-straining device from the strain applied thereto.

11. A release-device for parachute packs, comprising a rotatable cord reel, a ratchet wheel rotatable therewith, a power device for rotating said reel and ratchet wheel in one direction during the act of storing its power, a ratchet detent lever having one end in engagement with said ratchet wheel and its other end provided with a circular opening, an actuator lever pivotally secured and having an eccentric fitting into the circular opening of said ratchet detent-lever, and means for controlling the time movement of said ratchet detent lever through the medium of said actuating lever to disengage said ratchet detent lever from said ratchet wheel and permit the stored power of said power device to rotate said ratchet wheel and reel in an opposite direction.

12. A release-device for parachute packs, comprising a rotatable cord reel, a ratchet wheel rotatable therewith, a power device for rotating said reel and ratchet wheel in one direction during the act of storing its power, a ratchet detent lever having one end in engagement with said ratchet wheel and its other end provided with a circular opening, said ratchet detent lever being provided with a cam element at its lower edge, a roller having a fixed position and against which said cam element bears, an actuator lever pivotally secured and having an eccentric fitting into the circular opening of said ratchet detent lever, and means for controlling the time movement of said ratchet detent lever through the medium of said actuating lever to cause said cam element to move in contact with said roller so as to disengage said ratchet detent lever from said ratchet wheel and permit the stored power of said power-device to rotate said ratchet wheel and reel in an opposite direction.

WILLIAM BIRD.
DONALD R. CLARK.